US010664506B2

(12) United States Patent
Balasubramanian et al.

(10) Patent No.: US 10,664,506 B2
(45) Date of Patent: *May 26, 2020

(54) DECISION TABLE DECOMPOSITION USING SEMANTIC RELATIONS

(71) Applicant: International Business Machines Corporation, Armonk, NY (US)

(72) Inventors: Swaminathan Balasubramanian, Troy, MI (US); Pierre C. Berlandier, San Diego, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 434 days.

This patent is subject to a terminal disclaimer.

(21) Appl. No.: 15/702,788

(22) Filed: Sep. 13, 2017

(65) Prior Publication Data

US 2018/0004837 A1 Jan. 4, 2018

Related U.S. Application Data

(63) Continuation of application No. 14/972,259, filed on Dec. 17, 2015, now Pat. No. 9,830,383.

(51) Int. Cl.
*G06F 16/33* (2019.01)
*G06F 16/35* (2019.01)
*G06F 16/2455* (2019.01)
*G06N 5/02* (2006.01)

(52) U.S. Cl.
CPC ...... *G06F 16/3344* (2019.01); *G06F 16/2456* (2019.01); *G06F 16/35* (2019.01); *G06N 5/022* (2013.01)

(58) Field of Classification Search
CPC .................................................. G06F 16/3344
See application file for complete search history.

(56) References Cited

U.S. PATENT DOCUMENTS

| 2013/0041860 | A1* | 2/2013 | Lawrence | G06Q 30/0201 706/46 |
| 2013/0103615 | A1* | 4/2013 | Mun | G06Q 40/06 705/36 R |
| 2014/0304581 | A1* | 10/2014 | Stolte | G06F 17/246 715/215 |
| 2015/0317208 | A1* | 11/2015 | Desantis | G06F 11/1451 707/643 |

OTHER PUBLICATIONS

Balasubramanian et al "Decision Table Decomposition Using Semantic Relations", U.S. Appl. No. 14/972,259, filed Dec. 17, 2015.
List of IBM Patents or Patent Applications Treated as Related; (Appendix P), Filed Sep. 13, 2017; 2 pages.

* cited by examiner

*Primary Examiner* — Mariela Reyes
*Assistant Examiner* — Courtney Harmon
(74) *Attorney, Agent, or Firm* — Cantor Colburn LLP; Alexander Jochym

(57) ABSTRACT

A computer-implemented method for decomposing a decision table includes decomposing, by a computer processor, a decision table into a first sub-table and a second sub-table. The decision table includes two or more columns, and the decomposition is based on a semantic model describing relations among the two or more columns of the decision table. The first sub-table and the second sub-table together represent the decision table.

20 Claims, 8 Drawing Sheets

110

| credit score | income | property type | property state | max loan value |
|---|---|---|---|---|
| 800 | H | purchase | IL | v1 |
| 800 | M | purchase | IL | v1 |
| 800 | L | purchase | IL | v7 |
| 800 | H | refinance | IL | v2 |
| 800 | M | refinance | IL | v2 |
| 800 | L | refinance | IL | v8 |
| 800 | H | cash-out | IL | v3 |
| 800 | M | cash-out | IL | v3 |
| 800 | L | cash-out | IL | v9 |
| 800 | H | purchase | AR | v4 |
| 800 | M | purchase | AR | v4 |
| 800 | L | purchase | AR | v10 |
| 800 | H | refinance | AR | v5 |
| 800 | M | refinance | AR | v5 |
| 800 | L | refinance | AR | v11 |
| 800 | H | cash-out | AR | v6 |
| 800 | M | cash-out | AR | v6 |
| 800 | L | cash-out | AR | v12 |
| 500 | H | purchase | IL | v7 |
| 500 | M | purchase | IL | v13 |
| 500 | L | purchase | IL | v13 |
| 500 | H | refinance | IL | v8 |
| 500 | M | refinance | IL | v14 |
| 500 | L | refinance | IL | v14 |
| 500 | H | cash-out | IL | v9 |
| 500 | M | cash-out | IL | v15 |
| 500 | L | cash-out | IL | v15 |
| 500 | H | purchase | AR | v10 |
| 500 | M | purchase | AR | v16 |
| 500 | L | purchase | AR | v16 |
| 500 | H | refinance | AR | v11 |
| 500 | M | refinance | AR | v17 |
| 500 | L | refinance | AR | v17 |
| 500 | H | cash-out | AR | v12 |
| 500 | M | cash-out | AR | v18 |
| 500 | L | cash-out | AR | v18 |

Fig. 3

| | credit score | income | property type | property state | max loan value |
|---|---|---|---|---|---|
| $G_1$ | 800 | H | purchase | IL | v1 |
| $G_1$ | 800 | M | purchase | IL | v1 |
| | 800 | L | purchase | IL | v7 |
| $G_2$ | 800 | H | refinance | IL | v2 |
| $G_2$ | 800 | M | refinance | IL | v2 |
| | 800 | L | refinance | IL | v8 |
| $G_3$ | 800 | H | cash-out | IL | v3 |
| $G_3$ | 800 | M | cash-out | IL | v3 |
| | 800 | L | cash-out | IL | v9 |
| | 800 | H | purchase | AR | v4 |
| | 800 | M | purchase | AR | v4 |
| | 800 | L | purchase | AR | v10 |
| | 800 | H | refinance | AR | v5 |
| | 800 | M | refinance | AR | v5 |
| | 800 | L | refinance | AR | v11 |
| | 800 | H | cash-out | AR | v6 |
| | 800 | M | cash-out | AR | v6 |
| | 800 | L | cash-out | AR | v12 |
| | 500 | H | purchase | IL | v7 |
| $G_{13}$ | 500 | M | purchase | IL | v13 |
| $G_{13}$ | 500 | L | purchase | IL | v13 |
| | 500 | H | refinance | IL | v8 |
| $G_{14}$ | 500 | M | refinance | IL | v14 |
| $G_{14}$ | 500 | L | refinance | IL | v14 |
| | 500 | H | cash-out | IL | v9 |
| | 500 | M | cash-out | IL | v15 |
| | 500 | L | cash-out | IL | v15 |
| | 500 | H | purchase | AR | v10 |
| | 500 | M | purchase | AR | v16 |
| | 500 | L | purchase | AR | v16 |
| | 500 | H | refinance | AR | v11 |
| | 500 | M | refinance | AR | v17 |
| | 500 | L | refinance | AR | v17 |
| | 500 | H | cash-out | AR | v12 |
| | 500 | M | cash-out | AR | v18 |
| | 500 | L | cash-out | AR | v18 |

Fig. 4

|  | $C_a$ | | $C_b$ | | |
| --- | --- | --- | --- | --- | --- |
|  | credit score | income | property type | property state | max loan value |
| $G_1$ | 800 | H | purchase | IL | v1 |
|  | 800 | M | purchase | IL | v1 |
|  | 800 | L | purchase | IL | v7 |
| $G_2$ | 800 | H | refinance | IL | v2 |
|  | 800 | M | refinance | IL | v2 |
|  | 800 | L | refinance | IL | v8 |
| $G_3$ | 800 | H | cash-out | IL | v3 |
|  | 800 | M | cash-out | IL | v3 |
|  | 800 | L | cash-out | IL | v9 |
|  | 800 | H | purchase | AR | v4 |
|  | 800 | M | purchase | AR | v4 |
|  | 800 | L | purchase | AR | v10 |
|  | 800 | H | refinance | AR | v5 |
|  | 800 | M | refinance | AR | v5 |
|  | 800 | L | refinance | AR | v11 |
|  | 800 | H | cash-out | AR | v6 |
|  | 800 | M | cash-out | AR | v6 |
|  | 800 | L | cash-out | AR | v12 |
|  | 500 | H | purchase | IL | v7 |
| $G_{13}$ | 500 | M | purchase | IL | v13 |
|  | 500 | L | purchase | IL | v13 |
|  | 500 | H | refinance | IL | v8 |
| $G_{14}$ | 500 | M | refinance | IL | v14 |
|  | 500 | L | refinance | IL | v14 |
|  | 500 | H | cash-out | IL | v9 |
|  | 500 | M | cash-out | IL | v15 |
|  | 500 | L | cash-out | IL | v15 |
|  | 500 | H | purchase | AR | v10 |
|  | 500 | M | purchase | AR | v16 |
|  | 500 | L | purchase | AR | v16 |
|  | 500 | H | refinance | AR | v11 |
|  | 500 | M | refinance | AR | v17 |
|  | 500 | L | refinance | AR | v17 |
|  | 500 | H | cash-out | AR | v12 |
|  | 500 | M | cash-out | AR | v18 |
|  | 500 | L | cash-out | AR | v18 |

Fig. 5

| credit score | income | property type | property state | max loan value |
|---|---|---|---|---|
| 800 | H | purchase | IL | v1 |
| 800 | M | purchase | IL | v1 |
| 800 | L | purchase | IL | v7 |
| 800 | H | refinance | IL | v2 |
| 800 | M | refinance | IL | v2 |
| 800 | L | refinance | IL | v8 |
| 800 | H | cash-out | IL | v3 |
| 800 | M | cash-out | IL | v3 |
| 800 | L | cash-out | IL | v9 |
| 800 | H | purchase | AR | v4 |
| 800 | M | purchase | AR | v4 |
| 800 | L | purchase | AR | v10 |
| 800 | H | refinance | AR | v5 |
| 800 | M | refinance | AR | v5 |
| 800 | L | refinance | AR | v11 |
| 800 | H | cash-out | AR | v6 |
| 800 | M | cash-out | AR | v6 |
| 800 | L | cash-out | AR | v12 |
| 500 | H | purchase | IL | v7 |
| 500 | M | purchase | IL | v13 |
| 500 | L | purchase | IL | v13 |
| 500 | H | refinance | IL | v8 |
| 500 | M | refinance | IL | v14 |
| 500 | L | refinance | IL | v14 |
| 500 | H | cash-out | IL | v9 |
| 500 | M | cash-out | IL | v15 |
| 500 | L | cash-out | IL | v15 |
| 500 | H | purchase | AR | v10 |
| 500 | M | purchase | AR | v16 |
| 500 | L | purchase | AR | v16 |
| 500 | H | refinance | AR | v11 |
| 500 | M | refinance | AR | v17 |
| 500 | L | refinance | AR | v17 |
| 500 | H | cash-out | AR | v12 |
| 500 | M | cash-out | AR | v18 |
| 500 | L | cash-out | AR | v18 |

| credit score | income | borrower assessment |
|---|---|---|
| 800 | H | good |
| 800 | M | good |
| 800 | L | average |
| 500 | H | average |
| 500 | M | bad |
| 500 | L | bad |

| borrower assessment | property type | property state | max loan value |
|---|---|---|---|
| good | purchase | IL | v1 |
| average | purchase | IL | v7 |
| bad | purchase | IL | v13 |
| good | refinance | IL | v2 |
| average | refinance | IL | v8 |
| bad | refinance | IL | v14 |
| good | cash-out | IL | v3 |
| average | cash-out | IL | v9 |
| bad | cash-out | IL | v15 |
| good | purchase | AR | v4 |
| average | purchase | AR | v10 |
| bad | purchase | AR | v16 |
| good | refinance | AR | v5 |
| average | refinance | AR | v11 |
| bad | refinance | AR | v17 |
| good | cash-out | AR | v6 |
| average | cash-out | AR | v12 |
| bad | cash-out | AR | v18 |

Fig. 7B

DECISION TABLE DECOMPOSITION USING SEMANTIC RELATIONS

PRIORITY

This application is a continuation of and claims priority from U.S. patent application Ser. No. 14/972,259, filed on Dec. 17, 2015, entitled "DECISION TABLE DECOMPOSITION USING SEMANTIC RELATIONS," the entire contents of which are incorporated herein by reference.

BACKGROUND

Embodiments of the present invention relate to decision tables and, more specifically, to decision table decomposition using semantic relations. Decision tables provide a concise and precise way to model inference rules that follow a common structural pattern. Decision tables associate conditions with a set of actions to perform. To this end, a decision table includes one or more condition columns and one or more action columns. The condition columns correspond to conditions in the form of variables, relations, or predicates, whose possible value combinations are listed in the table entries. The actions columns are procedures or operations to perform when the corresponding conditions in the condition columns are met.

Presently, when decision tables grow too large (i.e., a large number of rows are needed to cover the possible combinations of values in the condition columns), both execution and maintainability suffer. A decision engine processing a large decision table might slow significantly, and maintaining this large decision table by adjusting the cell values can be inefficient and error prone. To reduce these issues, some methods exist to optimize decision tables using mathematical partition functions to split a large table into multiple sub-tables.

SUMMARY

According to an embodiment of this disclosure, a computer-implemented method for decomposing a decision table includes decomposing, by a computer processor, a decision table into a first sub-table and a second sub-table. The decision table includes two or more columns, and the decomposition is based on a semantic model describing relations among the two or more columns of the decision table. The first sub-table and the second sub-table together represent the decision table.

In another embodiment, a system for decomposing a decision table includes a memory having computer readable instructions and one or more processors for executing the computer readable instructions. The computer readable instructions include decomposing a decision table into a first sub-table and a second sub-table. The decision table includes two or more columns, and the decomposition is based on a semantic model describing relations among the two or more columns of the decision table. The first sub-table and the second sub-table together represent the decision table.

In yet another embodiment, a computer program product for decomposing a decision table includes a computer readable storage medium having program instructions embodied therewith. The program instructions are executable by a processor to cause the processor to perform a method. The method includes decomposing a decision table into a first sub-table and a second sub-table. The decision table includes two or more columns, and the decomposition is based on a semantic model describing relations among the two or more columns of the decision table. The first sub-table and the second sub-table together represent the decision table.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 illustrates an example decision table, according to some embodiments of this disclosure;

FIG. 4 illustrates groups formed during decomposition of the example decision table, according to some embodiments of this disclosure;

FIG. 5 illustrates a selection of a subset of condition columns in the example decision table, while decomposing the example decision table, according to some embodiment of this disclosure;

FIG. 6 illustrates a selection of sub-tuple groups in the example decision table, while decomposing the example decision table, according to some embodiments of this disclosure;

FIGS. 7A-7B illustrate first and second sub-tables of the decision table, according to some embodiments of this disclosure.

DETAILED DESCRIPTION

Conventional methods to optimize decision tables use mathematical partition functions to split a large table into multiple sub-tables. However, because there is no semantic context to guide this partition process, the resulting sub-tables are artificial and might not make sense to a user who needs to maintain these sub-tables. As a result, although the sub-table decomposition may reduce processing times, it does not help to improve ease of maintenance.

According to some embodiments of this disclosure, a decomposition system may partition a decision table into two or more sub-tables based on semantic relations among the decision variables (i.e., variables of the condition columns) in the table. When invoked, the decomposition system may process a semantic model, such as a business object model, used to define entities, attributes, or relations in the decision table. The decomposition system may process the decision table recursively, selecting a subset of condition columns that are semantically related and that satisfy selection criteria used to split the table. Recursions may continue until no further semantic relations exist on which to base a further recursion.

Figure 1:
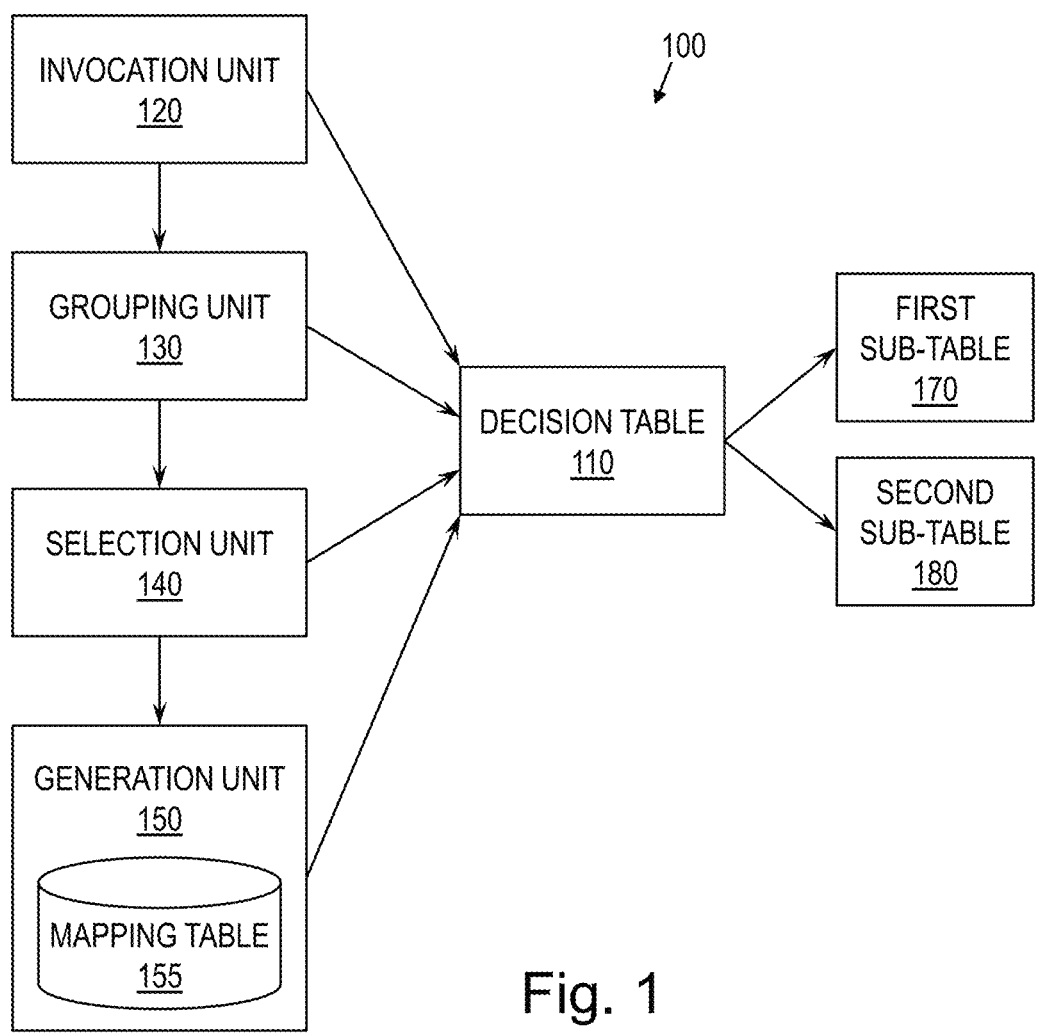
FIG. 1 is a block diagram of a decomposition system for decomposing a decision table, according to some embodiments of this disclosure.

FIG. 1 is a block diagram of a decomposition system 100, according to some embodiments of this disclosure. The decomposition system 100 may operate on a decision table 110 to decompose the decision table 110 into two or more sub-tables. In some embodiments, some of the columns of the decision table 110 may have semantic relations to other columns based on a semantic model. As shown, the decomposition system 100 may include an invocation unit 120, a grouping unit 130, a selection unit 140, and a generation unit 150.

Generally, the invocation unit 120 may invoke decomposition of a decision table 110; the grouping unit 130 may arrange rows of the decision table 110 into groups; the selection unit 140 may select condition columns that are related in the semantic model associated with the decision table 110, and that meet certain criteria described below; and with reference to a mapping table 155, the generation unit 150 may generate a first sub-table 170 and a complementary second sub-table 180 representing the original decision table 110. With the exception of the invocation, these tasks may be repeated until the decision table 110 can be split no further.

In some embodiments, the invocation unit 120, the grouping unit 130, the selection unit 140, and the generation unit 150 may each include hardware, software, or a combination of both. Further, the separation between these units is provided for illustrative purposes only, and one of skill in the art will understand that they may include overlapping hardware, software, or both.

Figure 2:
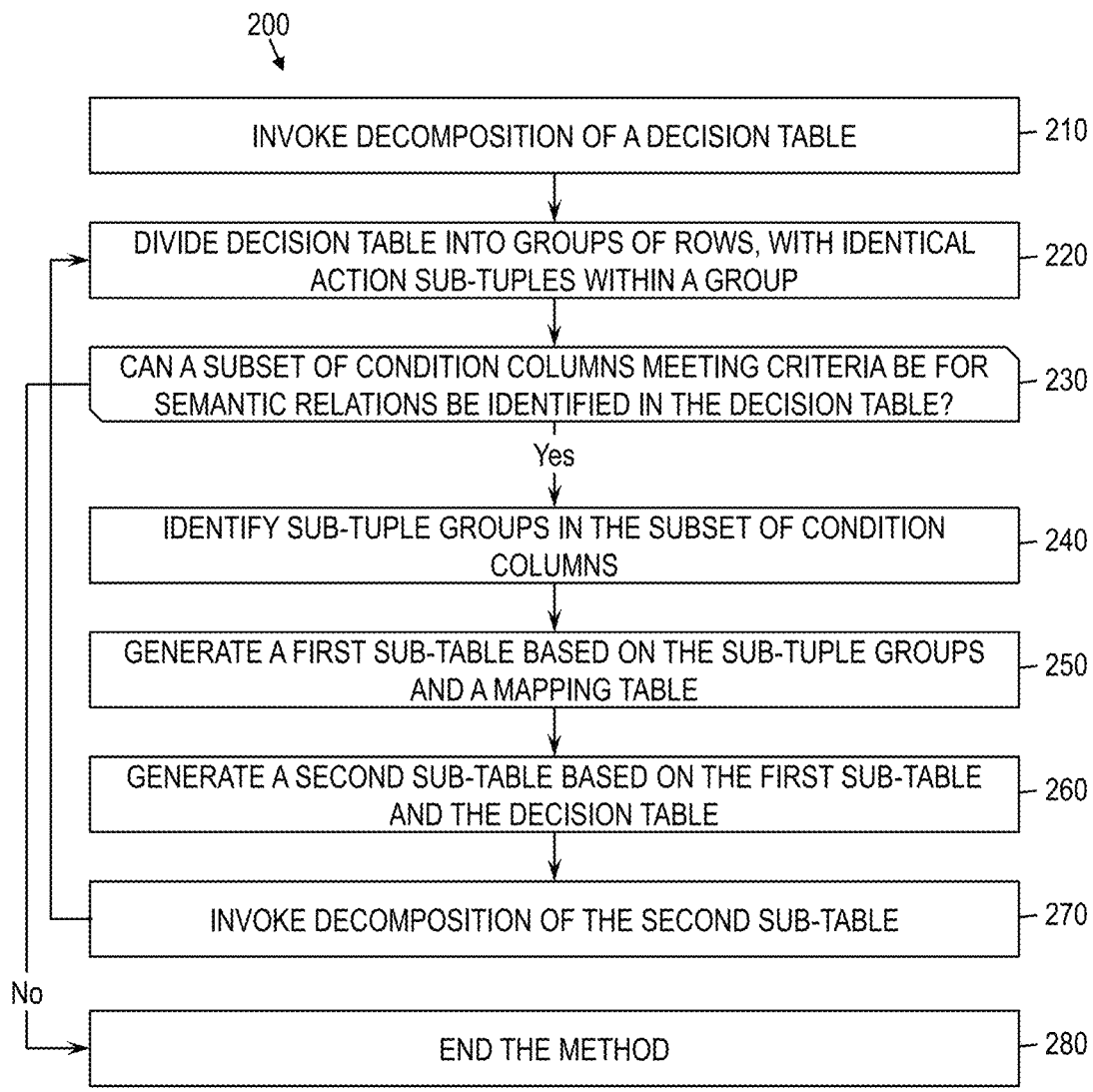
FIG. 2 is a flow diagram of a method for decomposing a decision table, according to some embodiments of this disclosure.

FIG. 2 is a flow diagram of a method 200 for decomposing a decision table 110, according to some embodiments of this disclosure. Throughout this disclosure, C refers to the set of condition columns of a decision table 110, and A refers to the set of action columns, where C and A may make up the entire set of columns of the decision table 110.

FIG. 3 illustrates an example decision table 110, according to some embodiments of this disclosure. This example decision table 110 will be used in an example referred to repeatedly below. Specifically, this example decision table 110 determines a maximum loan amount for a mortgage applicant given the applicant's credit score, income, property type, and property state. Accordingly, the condition columns are labeled "credit score," "income," "property type," and "property state," while the sole action column in this example is labeled "max loan value" and represents the maximum loan value determined based on the values in the condition columns. The values in the "max loan value" column are represented by variables $v_1$ through $v_{18}$, which are eighteen distinct values.

The following semantic model applies to this decision table 110:
1. Mortgage Applicant is an entity identified by an applicant social security number (SSN).
   A. Mortgage Applicant has a first name.
   B. Mortgage Applicant has a last name.
   C. Mortgage Applicant has an address.
2. Applicant Credit Report is an entity identified by an applicant SSN.
   A. Applicant Credit Report is related to Mortgage Applicant.
   B. Applicant Credit Report has a credit score.
   C. Applicant Credit Report has an income.
3. Property is an entity defined by a Multiple Listing Service (MLS) identifier.
   A. Property has a property type.
   B. Property has a property state.

Referring now back to FIG. 2, at block 210, decomposition of a decision table 110 may be invoked. In some embodiments, the invocation unit 120 may handle this invocation. The decomposition may be invoked upon determination that invocation criteria are met. These invocation criteria may vary based on implementation. For instance, in a first embodiment, the decomposition may be invoked manually, in which case the invocation criteria require a manual request to decompose the decision table 110. In a second embodiment, a size threshold may be used as the invocation criteria, and the decomposition may be invoked when the number of rows in the decision table exceeds the threshold size. In a third embodiment, a time threshold may be used as the invocation criteria, and the decomposition may be invoked when the time taken to process the decision table 110 by a decision engine exceeds the time threshold.

At block 220, the decomposition system 100 may divide the decision table 110 in groups of rows $\{G_1, \ldots, G_n\}$, such that each action sub-tuple (i.e., each row's set of values that span the action columns) in a given group $G_i$ is equivalent to other action sub-tuples in the same group. In some embodiments, this grouping may be performed by the grouping unit 130.

FIG. 4 illustrates some of the groups formed at block 220, given the example decision table 110 described above, according to some embodiments of this disclosure. Although only groups $G_1$, $G_2$, $G_3$, $G_{13}$, and $G_{14}$ are illustrated, it will be understood that there may be eighteen groups formed in this example, one for each value $v_i$ in the action column titled "max loan value," representing the maximum loan value. Further, although this example decision table 110 includes only a single action column, it will be understood that a decision table 110 may include one or more action columns. If multiple action columns are used, then each group may include rows having the same values across the combination of action columns.

Referring back to FIG. 2, at decision block 230, the decomposition system 100 may seek a subset $C_a$ of the condition columns C, such that the following criteria are met: (a) the condition columns in $C_a$ are semantically related to one another within the semantic model; and (b) the sub-tuples from a complementary subset of conditions columns $C_b$, where $C_a \cup C_b = C$, are identical within each group $G_i$. Further, the condition columns $C_a$ may be a proper subset of C, such that $C_a \neq C$. In some embodiments, the selection of $C_a$ may be performed by the selection unit 140.

In some cases, there may be more than a single subset of condition columns fitting the above criteria for selecting the subset $C_a$. In that case, some embodiments of the decomposition system 100 may select the subset having columns with the closest semantic relation, as compared to the columns within other subsets that are candidates for being selected as $C_a$, where closeness is defined as the distance in a tree representing the semantic model.

Returning to the example above, FIG. 5 illustrates a selection of a subset $C_a$ of the condition columns, according to some embodiment of this disclosure. In this example, the "credit score" and "income" columns are selected to be $C_a$, while the "property type" and "property state" columns act as $C_b$. For each group G, defined at block 220, the sub-tuples for the columns in $C_b$ are identical. For instance, for each row of group $G_1$, the sub-tuple for the columns in $C_b$ is {purchase, IL}, and for each row of group $G_2$, the sub-tuple for the columns in $C_b$ is {refinance, IL}.

Referring back to FIG. 2, if no such subset of columns $C_a$ can be identified in the decision table 110, then the method 200 may end at block 280, as will be described further below.

If a subset of columns $C_a$ is identified, then at block 240, the decomposition system 100 may identify sub-tuple groups $\{P_1, \ldots, P_k\}$ from the columns in $C_a$ in the groups $\{G_1, \ldots, G_n\}$. Specifically, the sub-tuple groups may be formed by collecting each distinct set of sub-tuples in the columns of $C_a$ from the groups identified in the decision table 110. For instance, a first sub-tuple group may be made up of the sub-tuples in the columns of $C_a$ in the rows of the first group $G_1$. In some embodiments, the locating of these sub-tuple groups may also be performed by the selection unit 140.

Returning to the above example, FIG. 6 illustrates the selection of sub-tuple groups, according to some embodiments of this disclosure. In this example, there are three sub-tuple groups. A first sub-tuple group $P_1$ includes a set of two sub-tuples {{800, H}, {800, M}}; a second sub-tuple group $P_2$ includes a set of two sub-tuples {{500, M}, {500, L}}; and a third sub-tuple group $P_3$ includes a set of two sub-tuples {{800, L}, {500, H}}.

Although each sub-tuple-group of this example includes the same number of sub-tuples, specifically two sub-tuples each, this need not be the case. Rather, the number of sub-tuples may vary across the sub-tuple groups.

Referring back to FIG. 2, at block 250, the decomposition system 100 may use the sub-tuple groups identified at block 240 to generate a first sub-table 170, which may be a new decision table 110. In some embodiments, this may be performed by the generation unit 150. The first sub-table 170 may use the condition columns $C_a$ as its complete set of condition columns, and may have a single action column that may be newly generated. In these condition columns, the rows of the first sub-table 170 may be filled with the values from the sub-tuple groups. In other words, the sub-tuples of the combined sub-tuple groups $\{P_1, \ldots, P_k\}$ may fill sub-tuples of the condition columns in the first sub-table 170.

For the example above, FIG. 7A illustrates the first sub-table 170, according to some embodiments. As shown, the first sub-table 170 includes six rows, each corresponding to a sub-tuple within the set of sub-tuple groups, which are $\{P_1, P_2, P_3\}$. Specifically, the sub-tuples filled into the rows of the first sub-table 170 are {{800, H}, {800, M}, {500, M}, {500, L}, {800, L}, {500, H}}

The action column, which may be newly generated, may be filled with values selected from the mapping table 155. The mapping table 155 may map sub-tuples in $C_a$ to an assessment value. In some embodiments, because specific columns selected for $C_a$ may not be known prior to beginning this method 200, the mapping table 155 may map each possible sub-tuple of the condition columns of the original decision table 110 to an assessment value. For each sub-tuple of the condition columns in the first sub-table 170, the decomposition system 100 may select the corresponding assessment value in the mapping table 155 as the value placed in the corresponding cell of action column.

In the ongoing example, as shown in FIG. 7A, this action column is labeled "borrower assessment," and the values in that column describe the borrower based on the condition columns of the first sub-table 170, which are the columns of $C_a$.

Referring back to FIG. 2, at block 260, the decomposition system 100 may generate a second sub-table 180, which may also be a decision table 110 and may be complementary to the first sub-table 170. In some embodiments, this may also be performed by the generation unit 150. The second sub-table 180 may be based on the original decision table 110 and the first sub-table 170. Together, the first sub-table 170 and second sub-table 180 may represent the original decision table 110 and may be a decomposition of the original decision table 110.

To form the second sub-table 180, the decomposition system 100 may take the original decision table 110 and replace the columns in $C_a$ with a new condition column representing the same variable as the action column of the first sub-table 170. More specifically, the first sub-table 170 may now provide a mapping for the columns of $C_a$ in the original decision table 110 to assessment values in the action column of the first sub-table 170. For each row of the original decision table 110, the decomposition system 100 may identify the sub-tuple in the columns of $C_a$ and identify the assessment value to which that sub-tuple maps according to the first sub-table 170. This assessment value may then replace the columns of $C_a$ on that row. The result of performing this for each row may be to replace the columns of $C_a$ in the original decision table 110 with a new condition column representing assessment values mapped to from the columns of $C_a$. In some cases, certain groups of rows may be equivalent (i.e., having the same value in each column) after this replacement, and each such group of rows may be consolidated into a single row. In other words, repeated rows may be removed in the second sub-table 180.

As a result of replacing the columns of $C_a$ with a single newly generated column of assessment values, the number of columns of the second sub-table 180 may be potentially reduced as compared to the original decision table 110. Further, as a result of consolidating equivalent rows after this replacement, the number of rows of the second sub-table 180 may be reduced as compared to the original decision table 110.

Returning to the above example, FIG. 7B illustrates the second sub-table 180, according to some embodiments of this disclosure. As shown, the columns of $C_a$, which represented "credit score" and "income" in the original decision table 110, are replaced with a single condition column representing "borrower assessment," which contains the mapped-to assessment values based on the first sub-table 170.

In FIG. 2, at block 270, decomposition of the second sub-table 180 may be invoked, and the method 200 may return to block 220, with the second sub-table now acting as the decision table 110 to be decomposed. The above operations for decomposing a decision table 110 may be performed recursively on the resulting second sub-tables 180 until a termination condition is met. That termination condition may be the inability to identify a subset $C_a$ of condition columns at block 230.

When the method 200 ends, after failing to identify a subset of columns $C_a$ at block 230, the resulting sub-tables may together form the decomposition of the original decision table 110. Because the method 200 may be performed recursively on the second sub-table 180, thus splitting the second sub-table 180 into two further sub-tables with each recursion, the result of the complete decomposition of the original decision table 110 may be two or more sub-tables. More specifically, an additional sub-table may be added to the decomposition with each recursion.

Figure 8:
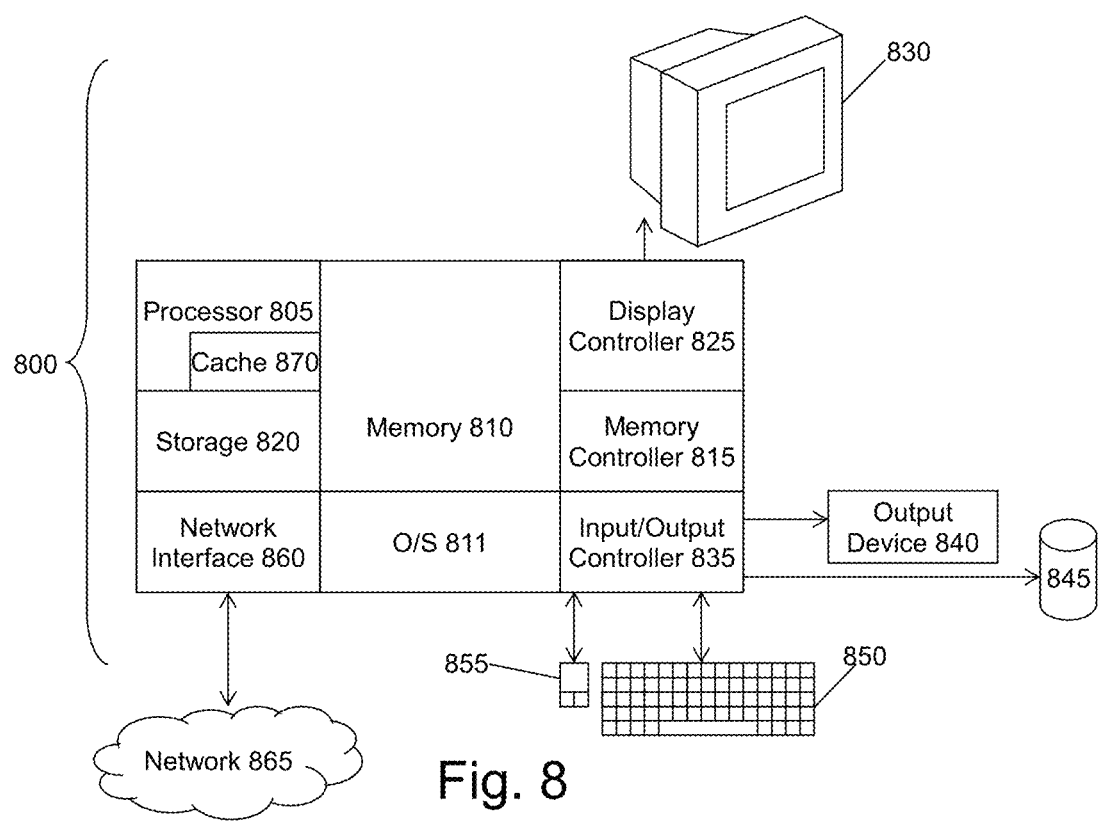
FIG. 8 is a block diagram of a computer system for implementing some or all aspects of the decomposition system, according to some embodiments of this disclosure.

FIG. 8 illustrates a block diagram of a computer system 800 for use in implementing a decomposition system 100 or method 200 according to some embodiments. The decomposition systems 100 and methods 200 described herein may be implemented in hardware, software (e.g., firmware), or a combination thereof. In some embodiments, the methods described may be implemented, at least in part, in hardware and may be part of the microprocessor of a special or general-purpose computer system 800, such as a personal computer, workstation, minicomputer, or mainframe computer. For instance, some aspects of the decomposition system 100 may be incorporated into a computer system 800, and the decomposition method 200 may be performed, in whole or in part, by a computer system 800.

In some embodiments, as shown in FIG. 8, the computer system 800 includes a processor 805, memory 810 coupled to a memory controller 815, and one or more input devices 845 and/or output devices 840, such as peripherals, that are communicatively coupled via a local I/O controller 835. These devices 840 and 845 may include, for example, a printer, a scanner, a microphone, and the like. Input devices such as a conventional keyboard 850 and mouse 855 may be coupled to the I/O controller 835. The I/O controller 835 may be, for example, one or more buses or other wired or wireless connections, as are known in the art. The I/O controller 835 may have additional elements, which are omitted for simplicity, such as controllers, buffers (caches), drivers, repeaters, and receivers, to enable communications.

The I/O devices 840, 845 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 805 is a hardware device for executing hardware instructions or software, particularly those stored in memory 810. The processor 805 may be a custom made or commercially available processor, a central processing unit (CPU), an auxiliary processor among several processors associated with the computer system 800, a semiconductor based microprocessor (in the form of a microchip or chip set), a macroprocessor, or other device for executing instructions. The processor 805 includes a cache 870, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 870 may be organized as a hierarchy of more cache levels (L1, L2, etc.).

The memory 810 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, or other types of storage media. Note that the memory 810 may have a distributed architecture, where various components are situated remote from one another but may be accessed by the processor 805.

The instructions in memory 810 may include one or more separate programs, each of which comprises an ordered listing of executable instructions for implementing logical functions. In the example of FIG. 8, the instructions in the memory 810 include a suitable operating system (OS) 811. The operating system 811 essentially may control the execution of other computer programs and provides scheduling, input-output control, file and data management, memory management, and communication control and related services.

Additional data, including, for example, instructions for the processor 805 or other retrievable information, may be stored in storage 820, which may be a storage device such as a hard disk drive or solid state drive. The stored instructions in memory 810 or in storage 820 may include those enabling the processor to execute one or more aspects of the decomposition systems 100 and methods 200 of this disclosure.

The computer system 800 may further include a display controller 825 coupled to a display 830. In some embodiments, the computer system 800 may further include a network interface 860 for coupling to a network 865. The network 865 may be an IP-based network for communication between the computer system 800 and an external server, client and the like via a broadband connection. The network 865 transmits and receives data between the computer system 800 and external systems. In some embodiments, the network 865 may be a managed IP network administered by a service provider. The network 865 may be implemented in a wireless fashion, e.g., using wireless protocols and technologies, such as WiFi, WiMax, etc. The network 865 may also be a packet-switched network such as a local area network, wide area network, metropolitan area network, the Internet, or other similar type of network environment. The network 865 may be a fixed wireless network, a wireless local area network (LAN), a wireless wide area network (WAN) a personal area network (PAN), a virtual private network (VPN), intranet or other suitable network system and may include equipment for receiving and transmitting signals.

Decomposition systems 100 and methods 200 according to this disclosure may be embodied, in whole or in part, in computer program products or in computer systems 800, such as that illustrated in FIG. 8.

Technical effects and benefits of some embodiments include the ability to decompose a decision table 110 based on a semantic model. As compared to the original decision table 110 the resulting sub-tables of the decomposition may be easier to process and may also be easier to manually maintain, due to the decomposition being based on semantics that a human can understand intuitively.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for decomposing a decision table, comprising:
    determining that invocation criteria are met for a decision table, wherein the decision table comprises two or more columns, and wherein the two or more columns of the decision table comprise:
        one or more condition columns together indicating, for each row of the decision table, a condition upon which an action is to be taken; and
        one or more action columns together indicating, for each row of the decision table, the action to be taken given the condition specified in the one or more condition columns;
    decomposing, by a computer processor, responsive to the invocation criteria being met, the decision table from a single table into a first sub-table and a second sub-table, the decomposing being based on a semantic model describing relations among the two or more columns of the decision table, and the decomposing being further based on a mapping table that maps each sub-tuple of the one or more condition columns to an assessment value, the decomposing comprising:
        dividing the decision table into two or more groups of rows, wherein each group of rows comprises one or more action sub-tuples representing values of the one or more action columns, and wherein the one or more action sub-tuples have equivalent values in the one or more action columns within each group of rows;
        selecting a first subset of condition columns from the one or more condition columns of the decision table, wherein the first subset of condition columns meets selection criteria requiring that values of the sub-tuples from a complementary subset of condition columns to the first subset of condition columns are identical within each group of rows;
        populating in the first sub-table the first subset of condition columns selected from the one or more condition columns of the decision table; and
        populating in the second sub-table a second subset of condition columns from the one or more condition columns of the decision table, wherein the second set of condition columns is distinct from the first set of condition columns;
    wherein each of the first sub-table and the second sub-table is a distinct decision table; and
    wherein the first sub-table and the second sub-table together represent the decision table.

2. The computer-implemented method of claim 1, wherein the decomposing further comprises:
    including in the first sub-table a new action column representing a respective assessment value of each row of the first sub-table, the respective assessment value of each row of the first sub-table being based at least in part on the mapping table.

3. The computer-implemented method of claim 2, wherein the decomposing further comprises:
    including in the second sub-table a new condition column representing a respective assessment value of each row of the second sub-table, the respective assessment value of each row of the second sub-table being based at least in part on the mapping table, and wherein, in the second sub-table, the new condition column replaces the first subset of condition columns in the decision table.

4. The computer-implemented method of claim 3, wherein the respective assessment value of each row of the first sub-table is determined as a value corresponding to a respective row of the first sub-table according to the mapping table, and wherein the respective assessment value of each row of the second sub-table is determined based on a value of a corresponding row in the decision table as mapped by the mapping table.

5. The computer-implemented method of claim 1, wherein the selecting the first subset of condition columns from among the one or more condition columns further comprises:
    identifying as the first subset of condition columns at least two of the one or more condition columns that are semantically related to one another based on the semantic model.

6. The computer-implemented method of claim 5, wherein the decomposing further comprises:
    identifying one or more sub-tuple groups from the first subset of condition columns, wherein the one or more sub-tuple groups comprise each distinct set of values of the sub-tuples in the first subset of condition columns from the groups of rows.

7. The computer-implemented method of claim 6, wherein the including in the first sub-table the new action column representing the respective assessment value of each row of the first sub-table comprises:
    generating the first sub-table comprising one or more new condition columns and the new action column;
    filling the one or more new condition columns of the first sub-table with the values of the sub-tuples from the one or more sub-tuple groups; and
    filling each row of the new action column of the first sub-table with a respective assessment value according to the mapping table to correspond to the value of the sub-tuple group in the one or more condition columns of the respective row of the first sub-table.

8. A system comprising:
    a memory having computer-readable instructions; and
    one or more processors for executing the computer-readable instructions, the computer-readable instructions comprising:
        determining that invocation criteria are met for a decision table, wherein the decision table comprises two or more columns, and wherein the two or more columns of the decision table comprise:
            one or more condition columns together indicating, for each row of the decision table, a condition upon which an action is to be taken; and
            one or more action columns together indicating, for each row of the decision table, the action to be taken given the condition specified in the one or more condition columns;
        decomposing, responsive to the invocation criteria being met, the decision table from a single table into a first sub-table and a second sub-table, the decomposing being based on a semantic model describing relations among the two or more columns of the decision table, and the decomposing being further based on a mapping table that maps each sub-tuple of the one or more condition columns to an assessment value, the decomposing comprising:
dividing the decision table into two or more groups of rows, wherein each group of rows comprises one or more action sub-tuples representing values of the one or more action columns, and wherein the one or more action sub-tuples have equivalent values in the one or more action columns within each group of rows;
selecting a first subset of condition columns from the one or more condition columns of the decision table, wherein the first subset of condition columns meets selection criteria requiring that values of the sub-tuples from a complementary subset of condition columns to the first subset of condition columns are identical within each group of rows;
populating in the first sub-table the first subset of condition columns selected from the one or more condition columns of the decision table; and
populating in the second sub-table a second subset of condition columns from the one or more condition columns of the decision table, wherein the second set of condition columns is distinct from the first set of condition columns;
wherein each of the first sub-table and the second sub-table is a distinct decision table; and
wherein the first sub-table and the second sub-table together represent the decision table.

9. The system of claim 8, wherein the decomposing further comprises:
including in the first sub-table a new action column representing a respective assessment value of each row of the first sub-table, the respective assessment value of each row of the first sub-table being based at least in part on the mapping table.

10. The system of claim 9, wherein the decomposing further comprises:
including in the second sub-table a new condition column representing a respective assessment value of each row of the second sub-table, the respective assessment value of each row of the second sub-table being based at least in part on the mapping table, and wherein, in the second sub-table, the new condition column replaces the first subset of condition columns in the decision table.

11. The system of claim 10, wherein the respective assessment value of each row of the first sub-table is determined as a value corresponding to a respective row of the first sub-table according to the mapping table, and wherein the respective assessment value of each row of the second sub-table is determined based on a value of a corresponding row in the decision table as mapped by the mapping table.

12. The system of claim 8, wherein the selecting the first subset of condition columns from among the one or more condition columns further comprises:
identifying as the first subset of condition columns at least two of the one or more condition columns that are semantically related to one another based on the semantic model.

13. The system of claim 12, wherein the decomposing further comprises:
identifying one or more sub-tuple groups from the first subset of condition columns, wherein the one or more sub-tuple groups comprise each distinct set of values of the sub-tuples in the first subset of condition columns from the groups of rows.

14. The system of claim 13, wherein the including in the first sub-table the new action column representing the respective assessment value of each row of the first sub-table comprises:
generating the first sub-table comprising one or more new condition columns and the new action column;
filling the one or more new condition columns of the first sub-table with the values of the sub-tuples from the one or more sub-tuple groups; and
filling each row of the new action column of the first sub-table with a respective assessment value according to the mapping table to correspond to the value of the sub-tuple group in the one or more condition columns of the respective row of the first sub-table.

15. A computer-program product for decomposing a decision table, the computer-program product comprising a computer-readable storage medium having program instructions embodied therewith, the program instructions executable by a processor to cause the processor to perform a method comprising:
determining that invocation criteria are met for a decision table, wherein the decision table comprises two or more columns, and wherein the two or more columns of the decision table comprise:
one or more condition columns together indicating, for each row of the decision table, a condition upon which an action is to be taken; and
one or more action columns together indicating, for each row of the decision table, the action to be taken given the condition specified in the one or more condition columns;
decomposing, responsive to the invocation criteria being met, the decision table from a single table into a first sub-table and a second sub-table, the decomposing being based on a semantic model describing relations among the two or more columns of the decision table, and the decomposing being further based on a mapping table that maps each sub-tuple of the one or more condition columns to an assessment value, the decomposing comprising:
dividing the decision table into two or more groups of rows, wherein each group of rows comprises one or more action sub-tuples representing values of the one or more action columns, and wherein the one or more action sub-tuples have equivalent values in the one or more action columns within each group of rows;
selecting a first subset of condition columns from the one or more condition columns of the decision table, wherein the first subset of condition columns meets selection criteria requiring that values of the sub-tuples from a complementary subset of condition columns to the first subset of condition columns are identical within each group of rows;
populating in the first sub-table the first subset of condition columns selected from the one or more condition columns of the decision table; and
populating in the second sub-table a second subset of condition columns from the one or more condition columns of the decision table, wherein the second set of condition columns is distinct from the first set of condition columns;
wherein each of the first sub-table and the second sub-table is a distinct decision table; and wherein the first sub-table and the second sub-table together represent the decision table.

16. The computer-program product of claim 15, wherein the decomposing further comprises:

including in the first sub-table a new action column representing a respective assessment value of each row of the first sub-table, the respective assessment value of each row of the first sub-table being based at least in part on the mapping table.

17. The computer-program product of claim 16, wherein the decomposing further comprises:

including in the second sub-table a new condition column representing a respective assessment value of each row of the second sub-table, the respective assessment value of each row of the second sub-table being based at least in part on the mapping table, and wherein, in the second sub-table, the new condition column replaces the first subset of condition columns in the decision table.

18. The computer-program product of claim 15, wherein the selecting the first subset of condition columns from among the one or more condition columns further comprises:

identifying as the first subset of condition columns at least two of the one or more condition columns that are semantically related to one another based on the semantic model.

19. The computer-program product of claim 18, wherein the decomposing further comprises:

identifying one or more sub-tuple groups from the first subset of condition columns, wherein the one or more sub-tuple groups comprise each distinct set of values of the sub-tuples in the first subset of condition columns from the groups of rows.

20. The computer-program product of claim 19, wherein the including in the first sub-table the new action column representing the respective assessment value of each row of the first sub-table comprises:

generating the first sub-table comprising one or more new condition columns and the new action column;

filling the one or more new condition columns of the first sub-table with the values of the sub-tuples from the one or more sub-tuple groups; and filling each row of the new action column of the first sub-table with a respective assessment value according to the mapping table to correspond to the value of the sub-tuple group in the one or more condition columns of the respective row of the first sub-table.

* * * * *